Dec. 16, 1924.
T. F. MORRISSEY
AUXILIARY AIR INLET FOR AUTOMOBILES
Filed Dec. 1, 1923
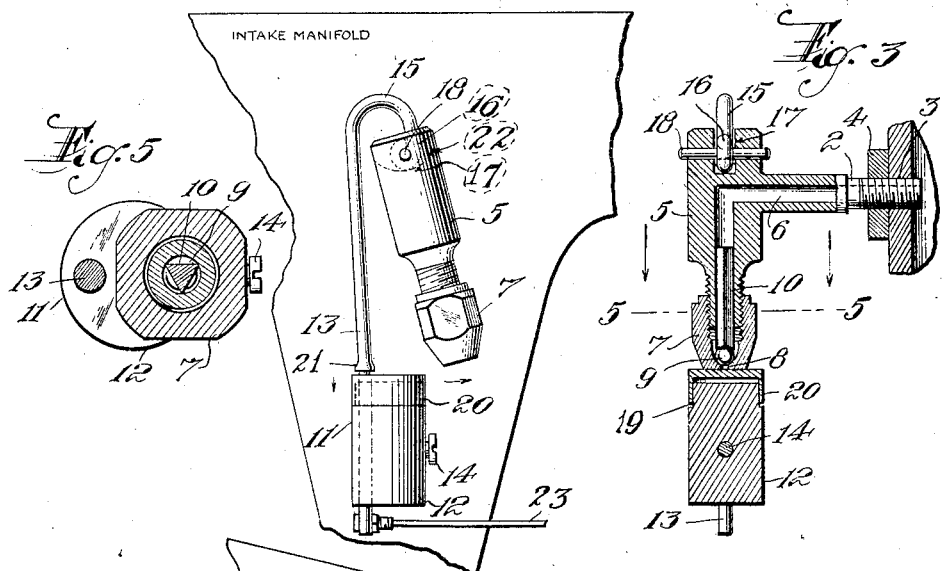
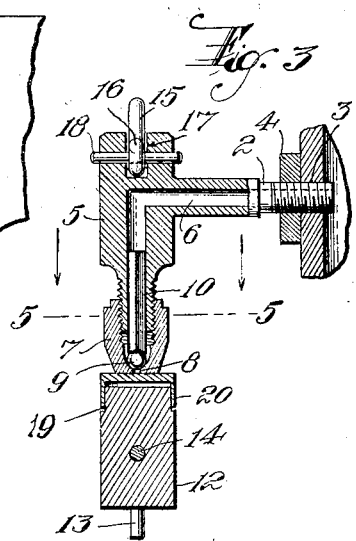
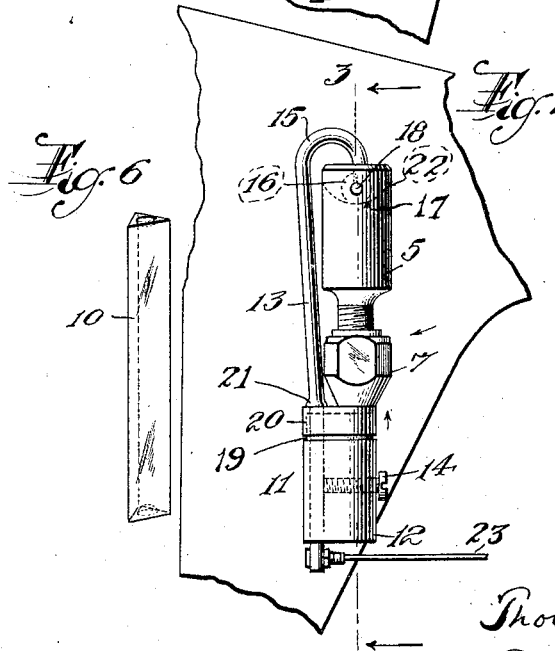
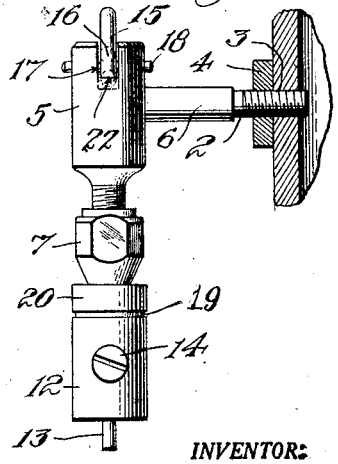
INVENTOR:
Thomas F. Morrissey,
BY Everett + Rook, ATTORNEYS.

Patented Dec. 16, 1924.

1,519,156

UNITED STATES PATENT OFFICE.

THOMAS F. MORRISSEY, OF EAST ORANGE, NEW JERSEY.

AUXILIARY AIR INLET FOR AUTOMOBILES.

Application filed December 1, 1923. Serial No. 678,078.

*To all whom it may concern:*

Be it known that I, THOMAS F. MORRISSEY, a citizen of the United States, and a resident of East Orange, in the county of Essex and State of New Jersey, have invented certain new and useful Improvements in Auxiliary Air Inlets for Automobiles, of which the following is a specification.

The objects of this invention are to provide an improved air inlet which can be readily applied to the manifold of an automobile engine and be automatically controlled by gravity so that it will be closed when the automobile is ascending a grade and normally open at other times; to secure a construction which will operate easily and effectively and yet shall be simple and not likely to get out of order; to enable the opening and closing of the device to be readily adjusted, and to obtain other advantages and results as may be brought out by the following description.

Referring to the accompanying drawing, in which like numerals of reference indicate the same parts throughout the several views, Figure 1 is a side view of my invention applied to the manifold of an automobile engine, showing the position of its parts when the car stands on a level;

Figure 2 is a similar view showing the position of the parts when the car is ascending a grade;

Figure 3 is a sectional view of the invention on line 3—3 of Fig. 2;

Figure 4 is a view of the device looking from the right-hand side of Figure 2;

Figure 5 is a cross-section on line 5—5 of Figure 3 and

Figure 6 is a detail perspective view of a certain valve weight.

In the specific embodiment of the invention shown in said drawings 1 indicates the manifold of an automobile engine and a threaded stem 2 of my improved device is screwed into a correspondingly tapped aperture 3 in the wall of said manifold, a lock nut 4 securing said stem in position, as shown in Figures 3 and 4. The stem 2 thus projects horizontally from the manifold, and at its outer end is the body 5 of the device arranged in such position that it will be inclined to the vertical when the automobile stands level, as shown in Figure 1, and will be substantially vertical when the automobile is ascending a grade, as shown in Figure 2. It will be understood that a duct 6 extends from the lower portion of the body 5 through the same and through the stem 2, so that air can pass through said duct into the manifold. Preferably an end piece 7 screws onto the reduced lower end of the body 5, having an aperture 8 for the air to pass and a valve such as the ball 9 to close said aperture by gravity. The weight of the ball is supplemented by a member 10 arranged above it in the duct 6 of the body 5, this weight 10 being slidably loose and of non-circular cross-section so as to permit the passage of air at its sides and through the duct 6.

Pivoted to the body part 5 is a gravity actuated closure 11 shown as consisting of a cylindrical member 12 supported by a wire rod 13 shown as extending longitudinally through said member 12 adjacent one side of itself, the said member being adjustable on the rod by means of a set screw 14 and the wire rod extending upward and being curved downwardly as at 15 and provided with an eye 16 to enter a slot 17 in the top of the body 5 and receive a pivotal pin 18. The cylindrical member 12 is recessed at its upper end, as at 19, to receive a cap 20 which can move up and down with respect to said member 12, such movement being limited by a burr 21 on the wire rod 13, and the upper face of said cap is adapted to seat against the lower end of the end piece 7 to close the air aperture 8 therein, as shown in Figures 2, 3 and 4.

It will be understood that when the automobile is standing upon level ground the pendulum member 11 swings out of alinement with the body part 5 of the device, as shown in Figure 1, thus leaving the aperture 8 open for air to be drawn in by the suction of the engine and mixed with the charge from the carbureter. However, when the automobile is ascending a grade the pendulum member 11 will swing into alinement with the body part 5, or said body part 5 move into alinement with the pendulum member, as shown in Figure 2, and the end face of the end piece 7 will lie so close to the top of the cap 20 that the suction will draw it thereagainst so as to shut off the entrance of any air, as shown in Figures 2, 3 and 4, and thus increase the richness of the explosive mixture.

Obviously, any desired adjustment of the parts may be made by screwing the end piece 7 on the body part 5, or by adjusting the pendulum member 11 upon the wire rod 13 by means of the set screw 14. The device can thus be made to work very accurately and effectively, and on account of its simplicity it is very easily applied and not liable to get out of order.

It will be noted that the wire rod 13 contacts with the side of the end piece 7, as a stop, when the air inlet is closed, see Figure 2, and preferably the bottom of the slot 17 is curved to provide a stop 22 to limit swinging of the pendulum member 11 in the other direction.

In case it is desired to close the auxiliary air inlet while starting the motor in cold weather, any suitable means may be provided for this purpose, such as a wire 23 attached to the pendulum member 11 and leading to the dash of the automobile (not shown) or other point convenient to the driver.

While I have shown and described one possible embodiment of the invention, it will be understood that this is only for the purpose of illustrating the principles of the invention and that many modifications and changes can be made in the details of the invention without departing from the spirit and scope thereof. Therefore, I do not desire to be understood as limiting myself except as required by the following claims when construed in the light of the prior art.

Having thus described the invention, what I claim is:

1. In a device of the character described, a body part having a stem adapted to be screwed into the wall of a manifold and providing an air passage through said body and stem, and a pendulum member mounted on said body part and adapted to underlie the same adjacent to the entrance to the air passage therein.

2. In a device of the character described, a body part having a stem adapted to be screwed into the wall of a manifold and providing an air passage through said body and stem, and a pendulum member mounted on said body part and adapted to underlie the same and having a movable portion to be drawn against said body part by suction and close the entrance to the air passage therein.

3. In a device of the character described, a body part having a stem adapted to be screwed into the wall of a manifold and providing an air passage through said body and stem, a pendulum member mounted on said body part and adapted to underlie the same, and a movable part on said pendulum member adapted to close the entrance to the air passage in the body part by suction.

4. In a device of the character described, a body part having a stem adapted to be screwed into the wall of a manifold and providing an air passage through said body and stem, and a pendulum member mounted on said body part and adapted to underlie the same adjacent to the entrance to the air passage therein, said pendulum member being adjustable so as to lie closer to or farther away from said entrance to the air passage.

5. In a device of the character described, a body part having a stem adapted to be screwed into the wall of a manifold and providing an air passage through said body and stem, an adjustable end piece on said body part having an air aperture, and a pendulum member mounted on said body part and adapted to underlie the said end piece thereof and restrict its said air aperture.

THOMAS F. MORRISSEY.